(12) United States Patent
Liu

(10) Patent No.: US 10,951,340 B2
(45) Date of Patent: Mar. 16, 2021

(54) METHOD AND DEVICE FOR TRANSMITTING BIT ERROR RATE INFORMATION IN FLEXE OVERHEAD FRAME, AND COMPUTER STORAGE MEDIUM

(71) Applicant: ZTE CORPORATION, Guangdong (CN)

(72) Inventor: Feng Liu, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/337,793

(22) PCT Filed: Nov. 21, 2017

(86) PCT No.: PCT/CN2017/112032
§ 371 (c)(1),
(2) Date: Mar. 28, 2019

(87) PCT Pub. No.: WO2018/059604
PCT Pub. Date: Apr. 5, 2018

(65) Prior Publication Data
US 2020/0007256 A1    Jan. 2, 2020

(30) Foreign Application Priority Data

Sep. 29, 2016 (CN) .......................... 201610870442.0

(51) Int. Cl.
*H04J 3/16* (2006.01)
*H04B 10/079* (2013.01)
(Continued)

(52) U.S. Cl.
CPC ........ *H04J 3/1652* (2013.01); *H04L 43/0847* (2013.01); *H04Q 11/0067* (2013.01); *H04Q 2011/0083* (2013.01)

(58) Field of Classification Search
CPC ......... H04L 43/0823–0847; H04J 3/16; H04B 10/07953
See application file for complete search history.

(56) References Cited

U.S. PATENT DOCUMENTS

| | | | | |
|---|---|---|---|---|
| 2004/0037569 | A1* | 2/2004 | Kamalov ......... | H04B 10/07953 398/162 |
| 2009/0092396 | A1* | 4/2009 | Lyubomirsky ..... | H04B 10/5167 398/89 |
| 2014/0199062 | A1* | 7/2014 | In De Betou .... | H04B 10/25753 398/5 |

FOREIGN PATENT DOCUMENTS

| | | |
|---|---|---|
| CN | 101080085 A | 11/2007 |
| CN | 102196321 A | 9/2011 |

(Continued)

OTHER PUBLICATIONS

Optical Internetworking Forum; Flex Ethernet Implementation Agreement, IA # OIF-FLEXE-01.0; Mar. 2016 [retrieved on Dec. 26, 2019]; retrieved from the Internet <URL: https://www.oiforum.com/wp-content/uploads/2019/01/OIF-FLEXE-01.0.pdf> (Year: 2016).*

(Continued)

*Primary Examiner* — Nathan M Cors
(74) *Attorney, Agent, or Firm* — Foley & Lardner LLP

(57) ABSTRACT

Disclosed is an information transmission method and device, and a computer storage medium. The method is applied to a local end in a flexible Ethernet (FlexE) network structure and includes: when receiving an information block of a FlexE frame, acquiring, by the local end, bit error state information in the received information block according to a preset acquisition policy; storing, by the local end, the bit error state information at a preset position in a FlexE protocol overhead frame; and transmitting, by the local end,
(Continued)

the FlexE protocol overhead frame storing the bit error state information to an opposite end.

15 Claims, 4 Drawing Sheets

(51) Int. Cl.
*H04L 29/00* (2006.01)
*H04L 12/26* (2006.01)
*H04Q 11/00* (2006.01)

(56) References Cited

FOREIGN PATENT DOCUMENTS

| | | |
|---|---|---|
| CN | 102487346 A | 6/2012 |
| CN | 103516477 A | 1/2014 |
| EP | 3 013 017 A1 | 4/2016 |

OTHER PUBLICATIONS

International Search Report and Written Opinion for International Appl. No. PCT/CN2017/112032, dated Jan. 31, 2018.
Optical Internetworking Forum, "Flex Ethernet Implementation Agreement", IA OIF-FLEXE-01.0, Mar. 2016, pp. 1-31.

* cited by examiner

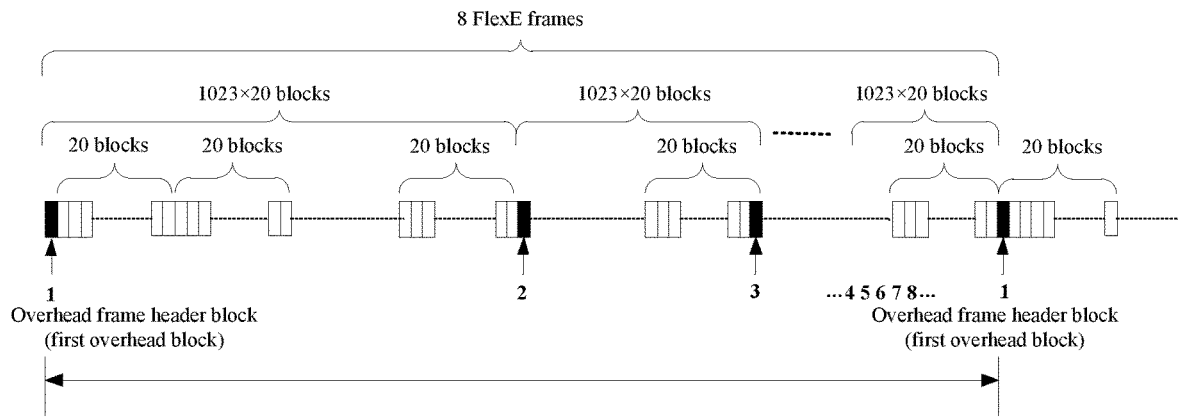
FIG. 7
FIG. 8
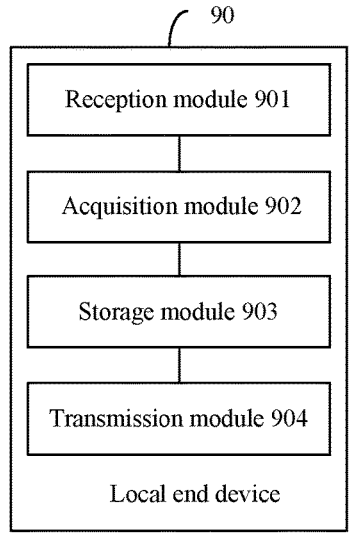
FIG. 9

METHOD AND DEVICE FOR TRANSMITTING BIT ERROR RATE INFORMATION IN FLEXE OVERHEAD FRAME, AND COMPUTER STORAGE MEDIUM

CROSS-REFERENCE TO RELATED APPLICATIONS

This is a National Stage Application, under 35 U.S.C. 371, of International Patent Application No. PCT/CN2017/112032, filed on Nov. 21, 2017, which claims priority to Chinese Patent Application No. 201610870442.0, filed on Sep. 29, 2016, contents of both of which are incorporated herein by reference in their entireties.

TECHNICAL FIELD

The present disclosure relates to network communication technology and, in particular, to an information transmission method and device, and computer storage medium.

BACKGROUND

The rapid development of network technology and the rapid increase of network information traffic have facilitated the rapid development of the transmission bandwidth of communication networks. The interface bandwidth speed of the communication device is increased from 10M (unit: bit/second) to 100M, and then increased to 1G and 10G. Currently, the interface bandwidth speed of 100G has been achieved, and a large number of commercial 100G optical modules have been put on the market.

At present, 400G optical modules have been developed, but the 400G optical modules are expensive, exceeding the price of four 100G optical modules, which results in the lack of commercial economic value of 400G optical modules. Therefore, in order to deliver 400G services on 100G optical modules, International Organization for Standardization has defined the Flexible Ethernet (FlexE) protocol.

The basic content of the FlexE protocol is to bundle multiple 100G transmission channels to form a deliver channel having a larger bandwidth speed. As shown in FIG. 1, a FlexE shim is added between the MAC layer and the physical coding sublayer (PCS) through the FlexE protocol, and four 100G physical channels are bundled through the FlexE shim so as to form a 400G logical channel, thereby meeting the deliver requirement of the 400G service without increasing the cost.

Because in the FlexE protocol, multiple physical channels are bundled into one logical channel for service delivery, when one physical channel fails, the entire logical channel fails. For example, as shown in FIG. 2, the interrupt of one physical channel causes the interrupt of the entire logical channel. That will reduce the reliability of the entire logical channel. Generally, the probability of fault on the logical channel is an integer multiple of the probability of fault on a single physical channel, and the integer multiple is the number of bundled physical channels for forming the logical channel.

However, in the current FlexE protocol, the indication function of transmitting the bit error state between the local end and the opposite end has not been defined. As a result, the local end and the opposite end are isolated from each other, and the signal bit error state of the opposite end may not be known. Therefore, the negotiation and the adoption of the alarm and protection action may be performed, thereby affecting the reliability and application value of the FlexE protocol.

SUMMARY

Embodiments of the present disclosure provide an information transmission method and device and a computer storage medium capable of implementing the indication of transmitting the bit error state between the local end and the opposite end in the FlexE protocol, so that the local end and the opposite end may not be isolated from each other, the signal bit error state of the opposite end may be known, and the negotiation and the adoption of the alarm and protection action may be performed, thereby improving the reliability and application value of the FlexE protocol.

In a first aspect, an embodiment of the present disclosure provides an information transmission method. The method is applied to the local end in the FlexE network structure and may include:

when receiving an information block of a FlexE frame, acquiring, by the local end, bit error state information in the received information block according to a preset acquisition policy;

storing, by the local end, the bit error state information at a preset position in a FlexE protocol overhead frame; and transmitting, by the local end, the FlexE protocol overhead frame storing the bit error state information to an opposite end.

In the embodiment described above, the bit error state information includes the number of bit errors existing in the information block of the FlexE frame received by the local end.

In the embodiment described above, before the step of acquiring, by the local end, bit error state information in the received information block according to a preset acquisition policy, the method further includes:

setting, by the local end, a detection field of a remote bit error state in a reserved field of the FlexE protocol overhead frame according to a preset setting policy.

In the embodiment described above, the detection field of the remote bit error state is obtained in a manner where the local end adds indication content of the remote bit error state at an undefined reserved position in the FlexE overhead frame.

In the embodiment described above, the detection field of the remote bit error state appears once every 8×1023×20 data blocks.

In the embodiment described above, when the bit error state information includes the number of bit errors existing in the information block of the FlexE frame received by the local end, the step of when receiving an information block of a FlexE frame, acquiring, by the local end, bit error state information in the received information block according to a preset acquisition policy specifically includes:

determining, by the local end, a monitoring starting end and a monitoring fishing end in a receiving direction; and monitoring, by the local end, an amount of bit error data in received data block content from the monitoring starting end to the monitoring finishing end.

In the embodiment described above, after the step of transmitting, by the local end, the FlexE protocol overhead frame storing the bit error state information to an opposite end, the method further includes:

negotiating, by the local end, with the opposite end according to the bit error state information, and performing a protection operation according to a result of the negotiation.

In a second aspect, an embodiment of the present disclosure provides a local end device. The local end device includes: a reception module, an acquisition module, a storage module and a transmission module.

The reception module is configured to receive the information block of the FlexE frame.

The acquisition module is configured to, when the reception module receives the information block of the FlexE frame, acquire bit error state information in the received information block according to the preset acquisition policy.

The storage module is configured to store the bit error state information at a preset position in a FlexE protocol overhead frame.

The transmission module is configured to transmit the FlexE protocol overhead frame storing the bit error state information to the opposite end.

In the embodiment described above, the bit error state information includes the number of bit errors existing in the information block of the FlexE frame received by the local end.

In the embodiment described above, the local end device further includes a setting module, which is configured to set, in the reserved field of the FlexE protocol overhead frame, the detection field of the remote bit error state according to the preset setting policy.

In the embodiment described above, the detection field of the remote bit error state is obtained in a manner where the setting module adds indication content of the remote bit error state at the undefined reserved position in the FlexE overhead frame.

In the embodiment described above, the detection field of the remote bit error state appears once every 8×1023×20 data blocks.

In the embodiment described above, when the bit error state information includes the number of bit errors existing in the information block of the FlexE frame received by the local end, the acquisition module is specifically configured to:

determine the monitoring starting end and the monitoring finishing end in the receiving direction; and monitor the amount of bit error data in received data block content from the monitoring starting end to the monitoring finishing end.

In the embodiment described above, the local end device further includes a negotiation module and an operation module. The negotiation module is configured to negotiate with the opposite end according to the bit error state information. The operation module is configured to perform the protection operation according to the result of the negotiation.

When performing the processing, the reception module, the acquisition module, the storage module, the transmission module, the setting module, a negotiation module and the operation module may be implemented by a central processing unit (CPU), a digital signal processor (DSP) or a field programmable gate array (FPGA).

An embodiment of the present disclosure further provides a computer storage medium, which is configured to store computer-executable instructions for executing the information transmission method described above.

In embodiments of the present disclosure, the local end acquires the bit error state information, stores the bit error state information at the preset position in the FlexE protocol overhead frame, and transmits the FlexE protocol overhead frame storing the bit error state information to the opposite end. Therefore, in the FlexE protocol, the indication of transmitting the bit error state between the local end and the opposite end is implemented, the local end and the opposite end may not be isolated from each other, the local end and the opposite end may know each other's signal bit error state of the opposite end, negotiate and adopt the same alarm and protection actions, thereby improving the reliability and application value of the FlexE protocol.

BRIEF DESCRIPTION OF DRAWINGS

FIG. 7 is a schematic diagram of a coverage range of an overhead frame according to an embodiment of the present disclosure;

FIG. 8 is a structural diagram of another overhead frame according to an embodiment of the present disclosure;

FIG. 9 is a structural diagram of a local end device according to an embodiment of the present disclosure;

DETAILED DESCRIPTION

Embodiments of the present disclosure will be described clearly and completely in conjunction with drawings in the embodiments of the present disclosure.

In an optical module, a 100G data packet is 64/66 encoded before being transmitted. That is, the 64-bit data is expanded into a 66-bit data block, and the added 2-bit data is disposed at the head of the 66-bit data block as a start flag of the 66-bit data block. After that, the 100G data packet is sent out from the optical port in the form of the 66-bit data block. In the receiving process, the optical port picks out the 66-bit data block from the received data stream, recovers the original 64-bit data from the 66-bit data block, and reassembles the original 64-bit data, so as to obtain the data packet.

Figure 3:
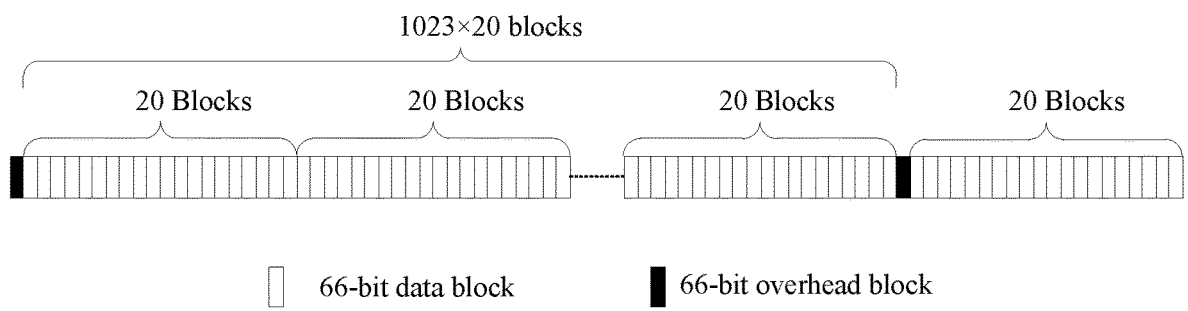
FIG. 3 is a schematic diagram of a coverage range of an overhead block according to an embodiment of the present disclosure.

The FlexE protocol is on the block transformation layer from the 64-bit data into the 66-bit data block. Before transmitting the 66-bit data block, a transmitting end sorts and plans the 66-bit data block. As shown in FIG. 3, the white block represents a 66-bit data block. For the 100G service, every 20 66-bit data blocks are grouped into one data block group. The 20 66-bit data blocks included in each data block group represent 20 time slots, and each time slot represents the service speed of the 5G bandwidth. When the transmitting end transmits the 66-bit data blocks, a FlexE overhead block is inserted every time 1023 data block groups (i.e., 1023×20 data blocks) are transmitted. The FlexE overhead block is represented by the black block shown in FIG. 3. After the FlexE overhead block is inserted, the transmitting end continues to transmit the data block. After the second 1023×20 data blocks are transmitted, the FlexE overhead block is inserted again and the data length of the FlexE overhead block is also 66 bits. The transmission and insertion operation are repeated. In this way, in the process of transmitting the data block, the FlexE overhead block is periodically inserted and the interval between two adjacent FlexE overhead blocks is 1023×20 data blocks.

Figure 1:
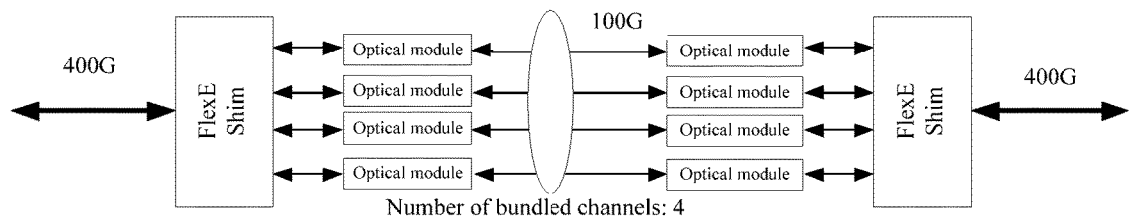
FIG. 1 is a structural diagram of a FlexE network structure according to an embodiment of the present disclosure.
Figure 2:
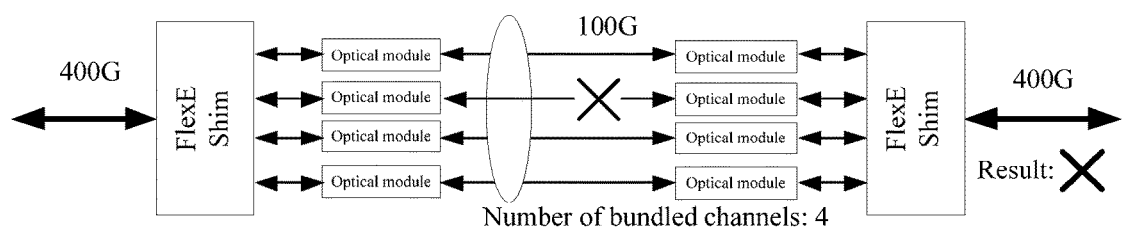
FIG. 2 is a schematic diagram of a case in which one physical channel fails in the related art.
Figure 4:
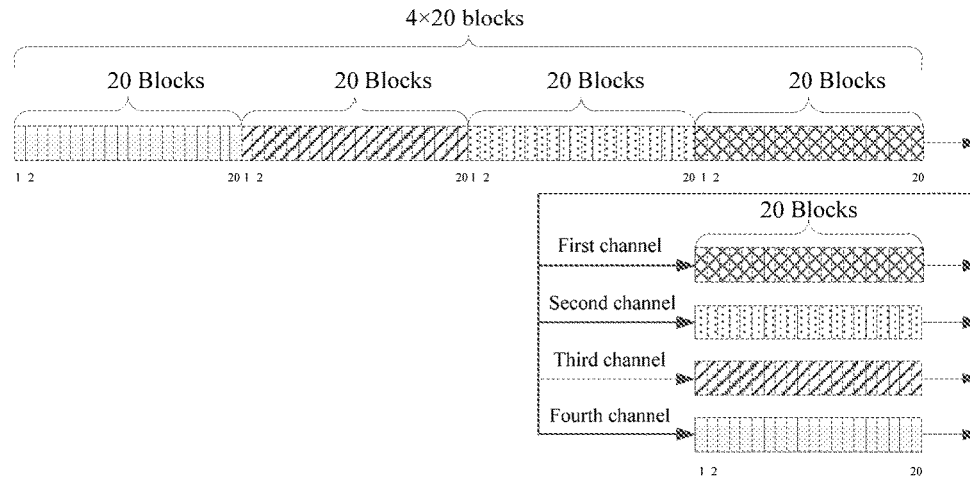
FIG. 4 is a schematic diagram of data transmission in the FlexE network structure according to an embodiment of the present disclosure.

When multiple physical channels having a small bandwidth speed are bundled into a logical channel having a large bandwidth speed by using the FlexE protocol, the transmitting end transmits all data blocks on the multiple physical channels having the small bandwidth speed in an average and polling way, so that the data blocks on all physical channels are fully aligned at the time of being transmitted, and the overhead blocks are simultaneously inserted on all physical channels at intervals of 1023 data block groups, so that the data blocks and overhead blocks on the physical channel are completely aligned. Using the FlexE network structure shown in FIG. 1 as an example, four 100G physical channels are bundled into a 400G logical channel. As shown in FIG. 4, the first data block group (i.e., the first 20 data blocks) is transmitted to the first physical channel; the second data block group (i.e., the second 20 data blocks) is transmitted to the second physical channel; the third data block group (i.e., the third 20 data blocks) is transmitted to the third physical channel; the fourth data block group (i.e., the fourth 20 data blocks) is transmitted to the fourth physical channel; the fifth data block group (i.e., the fifth 20 data blocks) is transmitted to the first physical channel; and so on. All data block groups are transmitted on four physical channels in the average and polling way of taking the remainder when dividing by 4.

At the receiving end, each physical channel separately receives data blocks and determines the overhead block position. All the physical channels realign the data block groups of the four physical channels based on the overhead block position. The data block groups of the four physical channels are aligned based on the overhead block position and then reordered according to the inverse process of the polling allocation at the time of transmission. The first data block groups, which are respectively located after the overhead block on the first physical channel, the second physical channel, the third physical channel and the fourth physical channel, are taken; the first data block group of the first physical channel is disposed before the first data block group of the second physical channel, the first data block group of the second physical channel is disposed before the first data block group of the third physical channel, and the first data block group of the third physical channel is disposed before the first data block group of the fourth physical channel. The process described above is repeated, that is, the second data block group located after the overhead block of the first physical channel is taken and disposed after the first data block group of the fourth physical channel, the second data block group located after the overhead block of the second physical channel is taken and disposed after the second data block group of the second physical channel, and so on. In this way, data block groups of four physical channels are reordered into a data block group of a large logical channel.

In this way, the four physical channels are bundled to form a large logical channel. In the aspect of services, the user only senses a large logical channel through which services are delivered, there is no need to know the underlying four physical channels.

Based on the example of FlexE network structure and the data transmission method described above, the following embodiments of the present disclosure are proposed.

Embodiment 1

Figure 5:
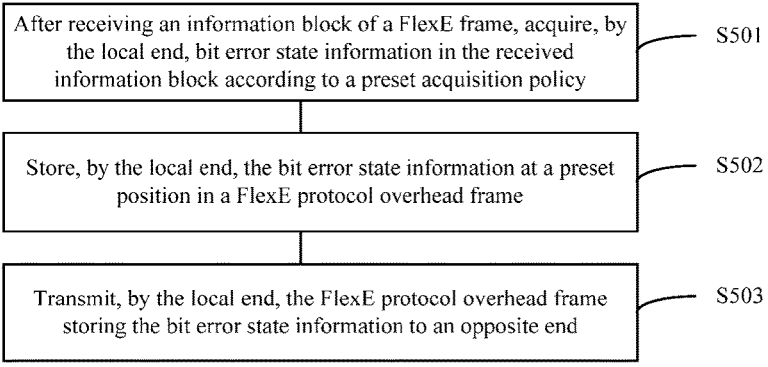
FIG. 5 is a flowchart of an information transmission method according to an embodiment of the present disclosure.

FIG. 5 shows an information transmission method provided by this embodiment. The method is applied to the local end in the FlexE network structure and may include the steps described below.

In step S501, after receiving an information block of a FlexE frame, the local end acquires bit error state information in the received information block according to a preset acquisition policy.

In step S502, the local end stores the bit error state information at a preset position in a FlexE protocol overhead frame.

In step S503, the local end transmits the FlexE protocol overhead frame storing the bit error state information to an opposite end.

It is to be noted that the bit error state information includes the number of bit errors existing in the information block of the FlexE frame received by the local end.

It is to be understood that after receiving the FlexE protocol overhead frame transmitted by the local end, the opposite end may extract the bit error state information acquired by the local end at the preset position of the received FlexE frame. As shown in FIG. 5, the local end (or referred to as the source end) and the opposite end (or referred to as the sink end) in the FlexE network structure may know the each other's bit error state information. The devices at both ends may negotiate and adopt a protection action according to the bit error state information. For example, the bit error information of both ends is reported and the physical channel with bit errors is removed from the bundle group, or abandoned, or even replaced with a backup physical channel. Therefore, in a case where the physical channel fails, the automatic switching function may be achieved and services can be recovered automatically, thereby greatly improving the reliability and application value of the FlexE service.

Figure 6:
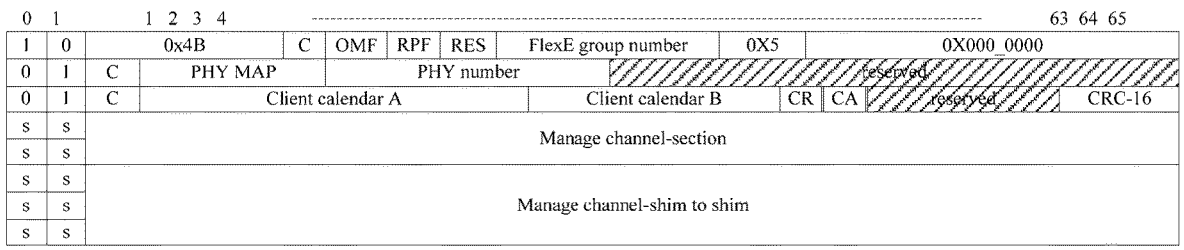
FIG. 6 is a structural diagram of an overhead frame according to an embodiment of the present disclosure.

In FIG. 5, for the overhead frame, it is to be noted that the data length of one FlexE overhead block is also 66 bits. When the data stream is transmitted, since one overhead block is inserted every 1023×20 data blocks, the overhead block has a positioning function in the entire data stream. That is, the positions of the first data block group and the subsequent data block groups in the entire data stream may be known based on the overhead block. The current FlexE overhead block is shown in FIG. 6. In the FlexE protocol, eight continuous overhead blocks form an overhead frame. Therefore, as shown in FIG. 7, the coverage range of one overhead frame is 8×1023×20 data blocks (represented by the white blocks) and eight overhead blocks (represented by the black blocks). In this embodiment, since the data block and the overhead block are collectively referred to as an information block, the coverage range of one overhead frame is 8×(1023×20+1) information blocks.

One overhead block is composed of a 2-bit block flag and 64-bit block content. The block flag is deposed in first two columns, and next 64 columns are the block content. The block flag of the first overhead block is 10, and the block flag of the next seven overhead blocks is 01 or SS (SS means that the content is uncertain). The content of the first overhead block includes: 0x4B (8 bits, hexadecimal 4B), C bit (1 bit, indicating adjustment control), OMF bit (1 bit, representing an overhead frame multi-frame indication), RPF bit (1 bit, representing an opposite end defect indication), RES bit (1 bit, reserved), FlexE group number (20 bits, representing the number of the bundle group), 0x5 (4 bits, hexadecimal 5), and 000000 (28 bits filled with 0s). 0x4B and 0x5 are the start flag of the first overhead block. In the receiving process, when one overhead block whose position is 0x4B and 0x5 is found, it means that the overhead block is the first overhead block of the overhead frame, and the overhead block and the subsequent seven continuous overhead blocks constitute one overhead frame. In the overhead frame, the reserved part is a reserved field, which has not been defined yet and shown by the diagonal block in FIG. 6. The content of other byte in the overhead block is irrelevant to the present disclosure, and therefore will not be specifically described.

As shown in FIG. 5, the local end acquires the bit error state information, stores the bit error state information at the preset position in the FlexE protocol overhead frame, and transmits the FlexE protocol overhead frame storing the bit error state information to the opposite end. Therefore, the indication of transmitting the bit error state between the local end and the opposite end is implemented, the local end and the opposite end may not be isolated from each other, the local end and the opposite end may know each other's the signal bit error state, negotiate and adopt the same alarm and protection actions, thereby improving the reliability and application value of the FlexE protocol.

Before the step S501 in FIG. 5, the method further includes a step described below.

The local end sets a detection field of a remote bit error state in the reserved field of the FlexE protocol overhead frame according to a preset setting policy.

It is to be understood that the detection field of the remote bit error state is the preset position in the step S502 used by the local end to store the bit error state information in the FlexE protocol overhead frame.

Specifically, the preset setting policy may be determined through pre-negotiation between the local end and the opposite end, or may be set by the upper layer system, which will not be described in this embodiment. The local end and the opposite end both know the position of the detection field of the remote bit error state in the reserved field of the overhead frame. Therefore, the opposite end may acquire the bit error state information after receiving the FlexE protocol overhead frame storing the bit error state information.

Specially, the local end may add indication content of the remote bit error state as the detection field of the remote bit error state at the undefined reserved position in the FlexE overhead frame. As shown in FIG. 8, using the remote error indicate (REI) field as an example, the local end adds one REI field at the reserved position in the overhead frame to transmit the bit error state information of the local end to the remote end.

It is to be noted that one REI filed is added in the overhead frame to transmit the bit error state information of the local end. Since the FlexE overhead block appears once every 1023×20 data blocks and the one overhead frame is composed of eight overhead blocks, the REI information appears once every 8×1023×20 data blocks.

The basic principle of this embodiment may be as follows. At the local end, in the receiving direction, the bit error state of one overhead frame (that is, the bit error state of 8×(1023×20+1) information blocks) is monitored, so as to obtain the bit error state information of the local end in the receiving direction; and in the transmitting direction, the monitored bit error state information in the receiving direction is filled in the REI field by the local end and then sent along with the FlexE frame. At the remote end, the REI filed content is extracted from the received FlexE frame, so that the remote end knows the bit error state information of the local end.

It is to be understood that no matter which direction the signal bit error occurs, the local end (or referred to as the source end) and the opposite end (or referred to as the sink end) in the FlexE network structure may know each other's bit error state information. The devices at both ends may negotiate and adopt the protection action according to the bit error state information. For example, the bit error information of both ends is reported and the physical channel with bit errors is removed from the bundle group, or abandoned, or even replaced with a backup physical channel. Therefore, in a case where the physical channel fails, the automatic switching function may be achieved and services can be recovered automatically, thereby greatly improving the reliability and application value of the FlexE service.

Exemplarily, when the bit error state information includes the number of bit errors existing in the information block of the FlexE frame received by the local end, the step S501 in which, after receiving the information block of the FlexE frame, the local end acquires bit error state information in the received information block according to the preset acquisition policy includes:

determining, by the local end, a monitoring starting end and a monitoring finishing end in a receiving direction; and monitoring, by the local end, the amount of bit error data in received data block content from the monitoring starting end to the monitoring finishing end.

For example, the received data block content is monitored from the first overhead block of the overhead frame which is used as the start position until the end of the eighth overhead block, and the amount of bit error data in the physical channels is monitored. The total number of bit error codes is n (n is a digital value including 0). Therefore, in the transmitting direction, the total number of bit errors is stored by the local end at the REI field position in the FlexE overhead frame and transmitted to the opposite end along with the FlexE overhead frame. The opposite end may extract the total number of bit errors stored in the REI filed from the FlexE frame, so that the opposite end knows the received bit error state of the local end.

In a similar way, in the two-way transmission, after any one end detects the error state information locally, both ends transmits the result of the monitoring to the opposite end at the same time, so that both ends may know each other's bit error state information, and may alarm the bit error state of the remote end to the upper layer, or negotiate with each other to take other protection actions, such as deleting physical channel with faults and enabling the backup physical channel, which will not be described in this embodiment.

It is to be noted that above examples are only used to illustrate the process of the above embodiment, and may be implemented in various flexible manners in the specific implementation. In an example, the REI field may be disposed at any position in the FlexE overhead frame structure. In another example, the length of the REI field may be 1 bit (for example, only representing that the bit error exists or not), or may be multiple bits (for example, representing the number of bit errors). In another example, the FlexE overhead frame structure may be provided with one REI filed. The REI filed may represent the global bit error state of all 20 time slots, or may represent the bit error state of some time slots. In another example, the FlexE overhead frame structure may be provided with one REI field, or may be provided with multiple REI fields for the delivery of various bit error information. In another example, the REI field in the FlexE overhead frame structure may be represent the bit error state information of the local end, or may represent other state information of the local end, such as light power attenuation of a laser. The above-mentioned disclosed implementation manners are not described in detail in this embodiment, but are included within the scope of the present disclosure.

Embodiment 2

Based on the same technical concepts in the embodiment described above, FIG. 9 shows a local end device 90 provided in this embodiment. As shown in FIG. 9, the local end device includes a reception module 901, an acquisition module 902, a storage module 903 and a transmission module 904.

The reception module 901 is configured to receive an information block of a flexible Ethernet (FlexE) frame.

The acquisition module 902 is configured to, after the reception module 901 receives the information block of the FlexE frame, acquire bit error state information in the received information block according to a preset acquisition policy.

The storage module 903 is configured to store the bit error state information at a preset position in a FlexE protocol overhead frame.

The transmission module 904 is configured to transmit the FlexE protocol overhead frame storing the bit error state information to an opposite end.

In an embodiment, the bit error state information includes the number of bit errors existing in the information block of the FlexE frame received by the local end.

Figure 10:
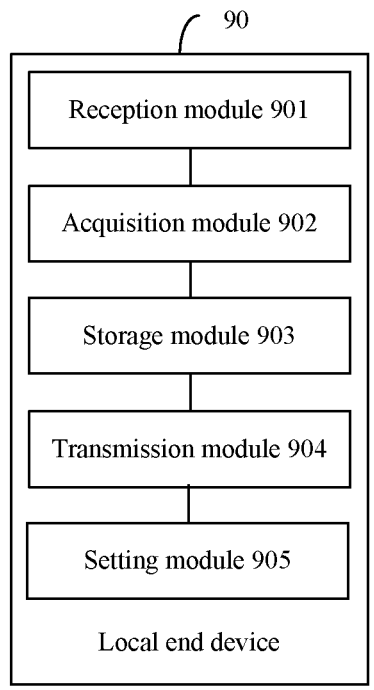
FIG. 10 is a structural diagram of another local end device according to an embodiment of the present disclosure.

In an embodiment, as shown in FIG. 10, the local end device 90 further includes a setting module 905, which is configured to set, in a reserved field of the FlexE protocol overhead frame, a detection field of a remote bit error state according to a preset setting policy.

In an embodiment, the detection field of the remote bit error state is obtained in a manner where the setting module adds indication content of the remote bit error state at the undefined reserved position in the FlexE overhead frame.

In an embodiment, the detection field of the remote bit error state appears once every 8×1023×20 data blocks.

In an embodiment, when the bit error state information includes the number of bit errors existing in the information block of the FlexE frame received by the local end, the acquisition module 902 is specifically configured to:

determine a monitoring starting end and a monitoring finishing end in a receiving direction; and monitor the amount of bit error data in received data block content from the monitoring starting end to the monitoring finishing end.

Figure 11:
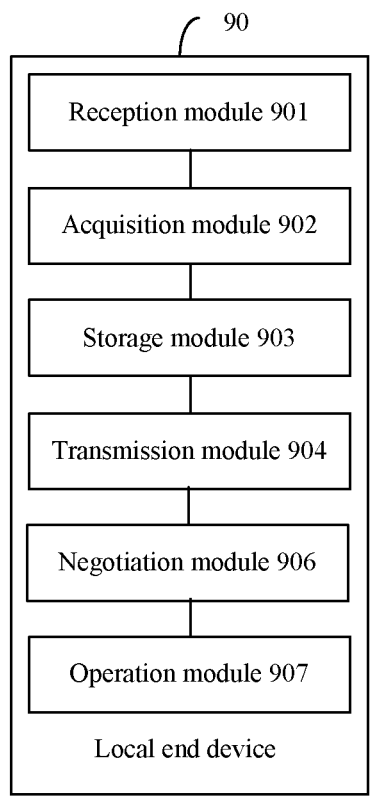
FIG. 11 is a structural diagram of yet another local end device according to an embodiment of the present disclosure.

In an embodiment, as shown in FIG. 11, the local end device 90 further includes a negotiation module 906 and an operation module 907.

The negotiation module 906 is configured to negotiate with the opposite end according to the bit error state information.

The operation module 907 is configured to perform a protection operation according to a result of the negotiation.

This embodiment provides the local end device 90. After the acquisition module 902 acquires the bit error state information, the storage module 903 stores the bit error state information at the preset position in the FlexE protocol overhead frame, and the transmission module 904 transmits the FlexE protocol overhead frame storing the bit error state information to the opposite end. Therefore, the indication of transmitting the bit error state between the local end and the opposite end is implemented, the local end and the opposite end may not be isolated from each other, the signal bit error state of the opposite end may be known, and the negotiation and adoption of the alarm and protection action may be performed, thereby improving the reliability and application value of the FlexE protocol.

The embodiments of the present disclosure further provide a computer storage medium, which is configured to store computer-executable instructions for executing the information transmission method of any one of embodiments described above.

It is to be understood by those skilled in the art that the embodiments of the present disclosure may be provided as methods, systems and computer program products. Therefore, the embodiments of the present application may be implemented by hardware, software, or a combination of hardware and software. In addition, the present disclosure may take the form of a computer program product implemented on one or more computer-usable storage media (including, but not limited to, a disk memory and an optical memory) that includes computer-usable program codes.

The present disclosure is described with reference to flowcharts and/or block diagrams of methods, apparatus (systems) and computer program products according to the embodiments of the present disclosure. It should be understood that computer program instructions implement each flow and/or block in the flowcharts and/or block diagrams and a combination of flows and/or blocks in the flowcharts and/or block diagrams. These computer program instructions can be provided to a processor of a general purpose computer, a special purpose computer, an embedded processor or other programmable data processing apparatus to produce a machine, such that instructions, which are executed via the processor of the computer or other programmable data processing apparatus, create a means for implementing one or more flows in the flowcharts or the functions specified in one or more blocks in the block diagrams.

These computer program instructions may also be stored in a computer-readable memory which can direct a computer or other programmable data processing apparatus to function in a particular manner, such that the instructions stored in the computer-readable memory produce an article of manufacture including instruction means which implement the function specified in one or more flows in the flowcharts and/or one or more blocks in the block diagrams.

These computer program instructions may also be loaded onto a computer or other programmable data processing apparatus to cause a series of operational steps to be executed on the computer or other programmable apparatus to produce a computer implemented process such that the instructions executed on the computer or other programmable apparatus provide steps for implementing one or more flows in the flowcharts and/or the functions specified in one or more blocks in the block diagrams.

The above are only preferred embodiments of the present disclosure and are not intended to limit the scope of the present disclosure.

INDUSTRIAL APPLICABILITY

In embodiments of the present disclosure, the local end acquires the bit error stat information, stores the bit error stat information at the preset position in the FlexE protocol overhead frame, and transmits the FlexE protocol overhead frame storing the bit error state information to the opposite end. Therefore, in the FlexE protocol, the indication of transmitting the bit error state between the local end and the opposite end is implemented, the local end and the opposite end may not be isolated from each other, the local end and the opposite end may know each other's signal bit error state of the opposite end, negotiate and adopt the same alarm and protection actions, thereby improving the reliability and application value of the FlexE protocol.

What is claimed is:

1. An information transmission method, applied to a local end in a flexible Ethernet (FlexE) network structure and comprising:
   when receiving an information block of a FlexE frame, acquiring, by the local end, bit error state information in the received information block according to a preset acquisition policy;
   storing, by the local end, the bit error state information at a preset position in a FlexE protocol overhead frame; and
   transmitting, by the local end, the FlexE protocol overhead frame storing the bit error state information to an opposite end,
   wherein before the step of acquiring, by the local end, bit error state information in the received information block according to a preset acquisition policy, the method further comprises:
   setting, by the local end, a detection field of remote bit error state information in a reserved field of the FlexE protocol overhead frame according to a preset setting policy;
   wherein the detection field of the remote bit error state information is obtained in a manner where the local end adds indication content of the remote bit error state information at the undefined reserved position in the FlexE overhead frame;
   wherein the bit error state information comprises a number of bit errors existing in the information block of the FlexE frame received by the local end.

2. The method according to claim 1, wherein the detection field of the remote bit error state information appears once every 8×1023×20 data blocks.

3. The method according to claim 1, wherein in a case where the bit error state information comprises the number of bit errors existing in the information block of the FlexE frame received by the local end, the step of when receiving an information block of a FlexE frame, acquiring, by the local end, bit error state information in the received information block according to a preset acquisition policy specifically comprises:
   determining, by the local end, a monitoring starting end and a monitoring finishing end in a receiving direction; and
   monitoring, by the local end, an amount of bit error data in received data block content from the monitoring starting end to the monitoring finishing end.

4. The method according to claim 1, wherein after the step of transmitting, by the local end, the FlexE protocol overhead frame storing the bit error state information to the opposite end, the method further comprises:
   negotiating, by the local end, with the opposite end according to the bit error state information, and performing a protection operation according to a result of the negotiation.

5. The method according to claim 1, wherein the detection field of the remote bit error state information is a remote error indicate (BEI) field added at the undefined reserved position in the FlexE overhead frame;
   wherein the BEI field has one of:
   one bit for indicating existence of a bit error; or
   a plurality of bits for indicating a quantity of bit errors.

6. A local end device, comprising:
   a processor; and
   a memory for storing instructions executable by the processor,
   wherein the processor is configured to:
   receive an information block of a flexible Ethernet (FlexE) frame;
   when receiving the information block of the FlexE frame, acquire bit error state information in the received information block according to a preset acquisition policy;
   store the bit error state information at a preset position in a FlexE protocol overhead frame; and
   transmit the FlexE protocol overhead frame storing the bit error state information to an opposite end,
   wherein the processor is further configured to set, in a reserved field of the FlexE protocol overhead frame, a detection field of remote bit error state information according to a preset setting policy;
   wherein the detection field of the remote bit error state information is obtained in a manner of adding indication content of the remote bit error state information at an undefined reserved position in the FlexE overhead frame;
   wherein the bit error state information comprises a number of bit errors existing in the information block of the FlexE frame received by the local end.

7. The local end device according to claim 6, wherein the detection field of the remote bit error state information appears once every 8×1023×20 data blocks.

8. The local end device according to claim 6, wherein in a case where the bit error state information comprises the number of bit errors existing in the information block of the FlexE frame received by the local end, the processor is specifically configured to:
   determine a monitoring starting end and a monitoring finishing end in a receiving direction; and
   monitor an amount of bit error data in received data block content from the monitoring starting end to the monitoring finishing end.

9. The local end device according to claim 6, wherein the processor is further configured to:
   negotiate with the opposite end according to the bit error state information; and
   perform a protection operation according to a result of the negotiation.

10. The local end device according to claim 6, wherein the detection field of the remote bit error state information is a remote error indicate (BEI) field added at the undefined reserved position in the FlexE overhead frame;
    wherein the BEI field has one of:
    one bit for indicating existence of a bit error; or
    a plurality of bits for indicating a quantity of bit errors.

11. A non-transitory computer-readable storage medium, which is configured to store computer-executable instructions for executing an information transmission method,
    wherein the information transmission method is applied to a local end in a flexible Ethernet (FlexE) network structure and comprises:

when receiving an information block of a FlexE frame, acquiring, by the local end, bit error state information in the received information block according to a preset acquisition policy;

storing, by the local end, the bit error state information at a preset position in a FlexE protocol overhead frame; and transmitting, by the local end, the FlexE protocol overhead frame storing the bit error state information to an opposite end, wherein before the step of acquiring, by the local end, bit error state information in the received information block according to a preset acquisition policy, the method further comprises:

setting, by the local end, a detection field of remote bit error state information in a reserved field of the FlexE protocol overhead frame according to a preset setting policy;

wherein the detection field of the remote bit error state information is obtained in a manner where the local end adds indication content of the remote bit error state information at the undefined reserved position in the FlexE overhead frame;

wherein the bit error state information comprises a number of bit errors existing in the information block of the FlexE frame received by the local end.

12. The non-transitory computer-readable storage medium according to claim 11, wherein the detection field of the remote bit error state information appears once every 8×1023×20 data blocks.

13. The non-transitory computer-readable storage medium according to claim 11, wherein in a case where the bit error state information comprises the number of bit errors existing in the information block of the FlexE frame received by the local end, the step of when receiving an information block of a FlexE frame, acquiring, by the local end, bit error state information in the received information block according to a preset acquisition policy specifically comprises:

determining, by the local end, a monitoring starting end and a monitoring finishing end in a receiving direction; and monitoring, by the local end, an amount of bit error data in received data block content from the monitoring starting end to the monitoring finishing end.

14. The non-transitory computer-readable storage medium according to claim 11, wherein after the step of transmitting, by the local end, the FlexE protocol overhead frame storing the bit error state information to the opposite end, the method further comprises: negotiating, by the local end, with the opposite end according to the bit error state information, and performing a protection operation according to a result of the negotiation.

15. The non-transitory computer-readable storage medium according to claim 11, wherein the detection field of the remote bit error state information is a remote error indicate (BEI) field added at the undefined reserved position in the FlexE overhead frame;

wherein the BEI field has one of:

one bit for indicating existence of a bit error; or a plurality of bits for indicating a quantity of bit errors.

* * * * *